Figure 2:
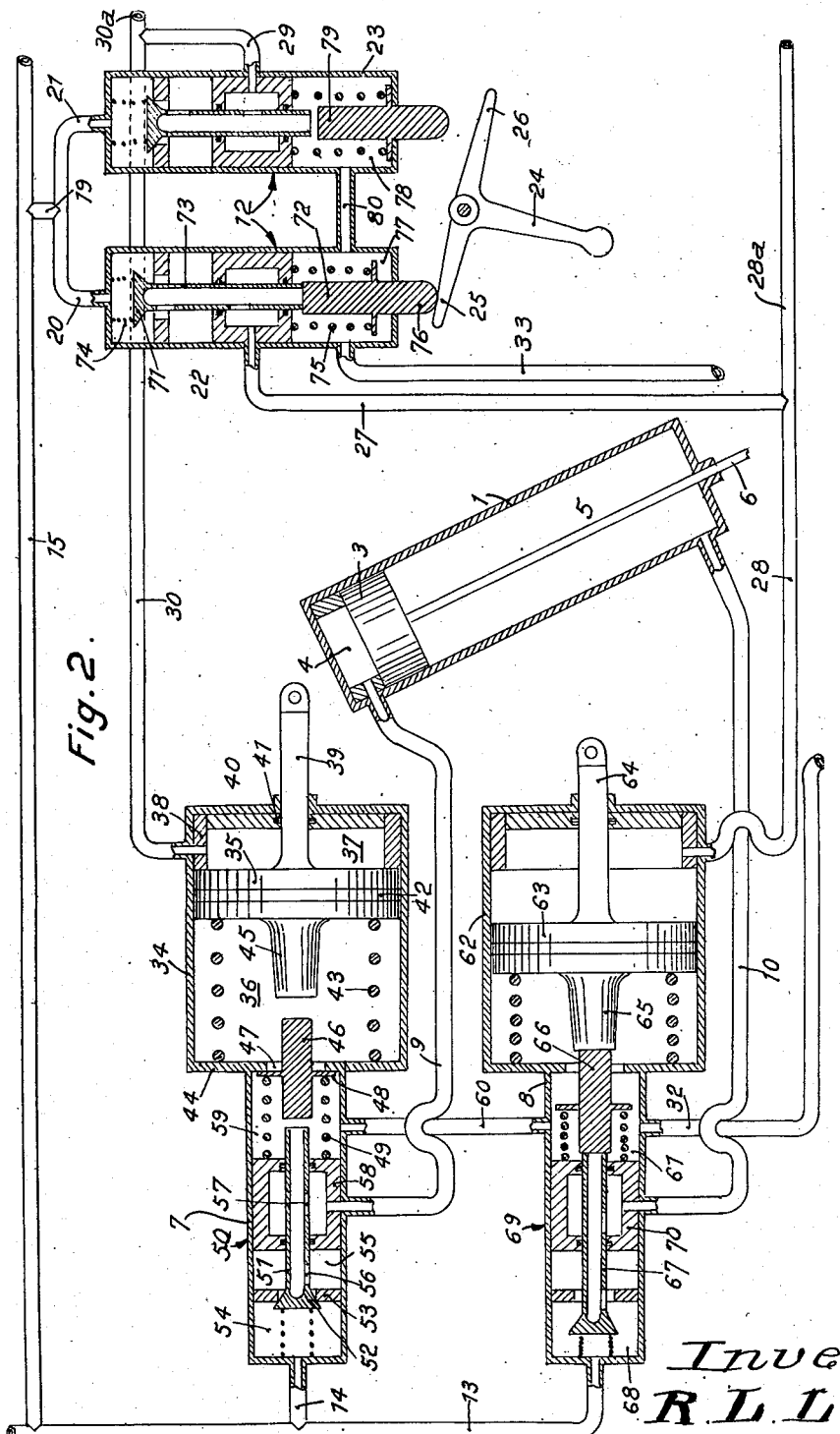

April 8, 1952     R. L. LEVY     2,591,839
RETRACTABLE LANDING GEAR FOR AIRCRAFT
Filed May 27, 1946     3 Sheets-Sheet 1

Fig. 1.

Inventor
R. L. Levy
By Glascock Downing Little
Attys.

April 8, 1952 R. L. LEVY 2,591,839
RETRACTABLE LANDING GEAR FOR AIRCRAFT
Filed May 27, 1946 3 Sheets-Sheet 3
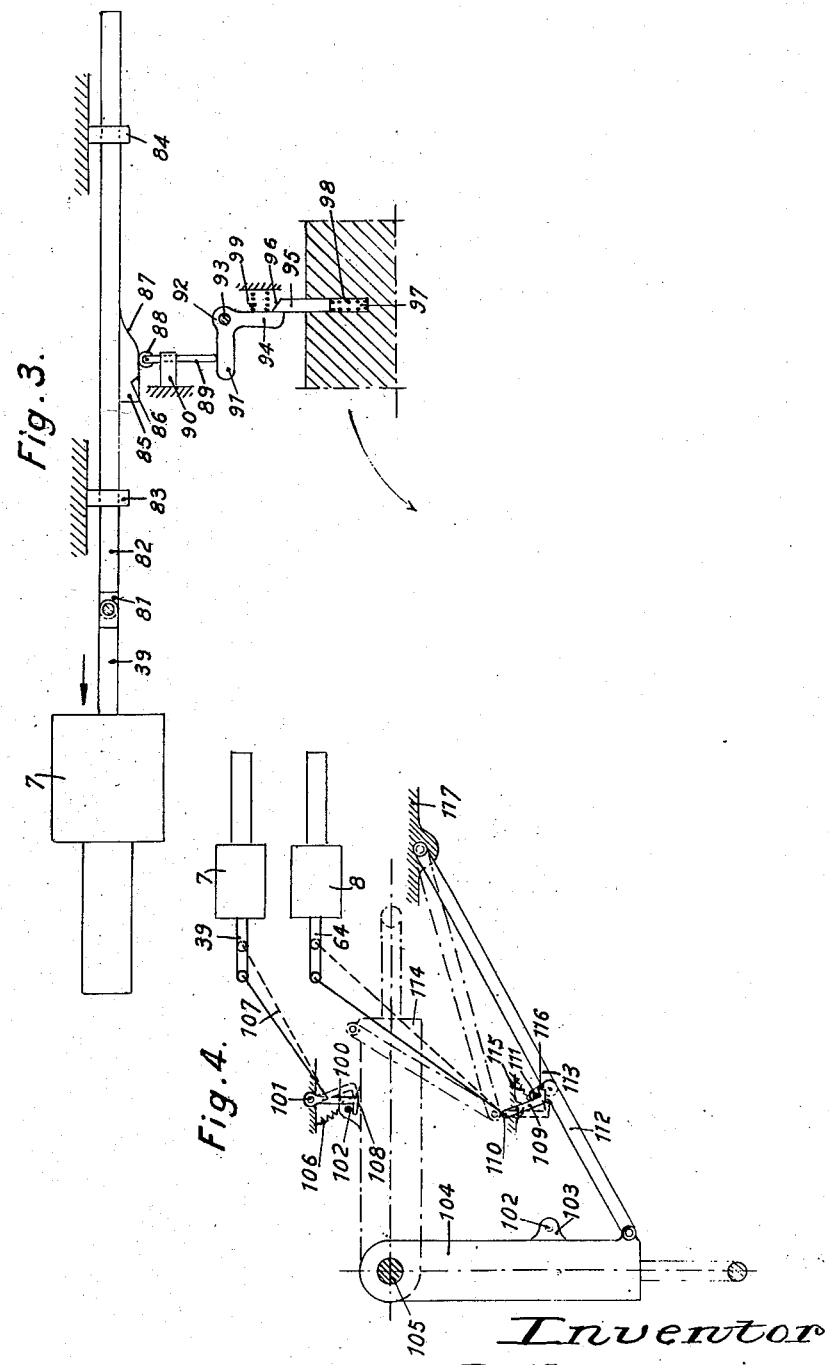
Inventor
R. L. Levy Patented Apr. 8, 1952

2,591,839

UNITED STATES PATENT OFFICE 2,591,839

RETRACTABLE LANDING GEAR FOR AIRCRAFT

René Lucien Levy, Paris, France, assignor to Societe d'Inventions Aeronautiques et Mecaniques S. I. A. M., Geneve, Switzerland, a corporation of Switzerland Application May 27, 1946, Serial No. 672,510
In France January 7, 1942

Section 1, Public Law 690, August 8, 1946
Patent expires January 7, 1962

6 Claims. (Cl. 60—51)

The present invention relates to retractable landing gear for aircraft and more particularly relates to a control system governing the retraction and extension or lowering of such gear of the type in which the movement of the gear is effected by hydraulic means. Such landing gear control systems are generally known which provide locking means cooperable with the gear in both the retracted and extended position. However known arrangements do not afford sufficient security or safety since their operation for the most part is predicated upon the condition of the hydraulic fluid governing the operation of the gear. In other words if there is leakage in the fluid circuit of the landing gear system and the locking means are being dependent upon the same fluid circuit, the raising and lowering means are ineffective. The same drawback can occur merely through a dilatation of the fluid in the circuit.

Therefore the present invention has for a primary object to provide a landing gear system in which the locking means is effective in either the retracted or the lowered or extended position of the gear. The system of the present invention is operative to maintain the gear locked in either of its extreme positions even if there is a dilatation of the liquid in the system, mere leakage of fluid or total disruption of the system by breakage of the pipes or conduits. The system in accordance with the present invention therefore is consistent with the present used operating practices governing use of aircraft with retractable landing gear. In the past retractable landing gear systems were designed with an object that if damage occurred to the fluid circuit while the gears were in retracted condition they were thereby lowered. Under present day flight operation it is preferable to risk the so-called belly-landing with the gears retracted and retain the effect attendant to retracted gears in order to provide the aircraft with maximum efficiency during flight. The system of the present invention conforms to this conception of flight operation since the gears once retracted are locked and if the fluid circuit is disrupted the gears remain retracted. Additionally if the gears are lowered when the circuit is disrupted the same remain lowered or extended.

Therefore this system has for an additional object to provide a landing gear control system including locking means the operation of which is independent of the condition of the fluid circuit controlling the raising and lowering of the gear.

It is another object to provide such a system in which, while the locking means remain independent of the fluid circuit so as to provide the proper locking effect, the unlocking of such locking means is effected by the control means governing the fluid circuit controlling the raising and lowering of the gear.

It is an additional object to provide a landing gear system in which the unlocking of the locking means is effected before the application of the power stroke for effecting raising or lowering of the landing gear so that undue strains on the locking means are avoided.

Another object of the present invention resides in the fact that the motive pressure that moves the landing gear toward either of its extreme positions, that is either its retracted or lowered position, remains applied after the fulfillment of this movement thus relieving the mechanical locking means and contributing to the maintenance of the gear in the position thus reached. Specifically therefore, the present invention has for an object to provide a retractable landing gear system in which the movement of the gear between its extreme positions is controlled through a hydraulic relay, the actuating member of which has an initial phase of movement termed the approaching phase which does not affect the relay but which does unlock the locking means. Specifically the relay constitutes a suitable valve such as a slide valve and its actuating member constitutes a piston normally disposed in spaced relation to the valve and the unlocking of the locking means being controlled by the rod of this piston.

More specifically the piston is operative on the relay through a pusher member normally spaced from the valve so that the movement of the pushing member constitutes the approaching phase.

For a further specific object the rod of the piston controlling the relay is associated with cam means operative upon a member controlling the unlocking of the locking means which cam member is operative during the approaching movement of the piston toward the relay controlled thereby.

In an alternative arrangement the rod of this control piston is directly connected to the member controlling the unlocking of the locking means.

In the present system the power for moving the landing gear is provided by two hydro-pneumatic accumulators each primarily operative upon one-half of the gear. The two accumulators are mounted in series with a pump and their capacity is such that without the intervention of the pump, as to effect two consecutive operations of the gear, for example a retraction movement and an extension or lowering movement. This arrangement thereby providing a system in which the conduits or piping connecting the accumulators, the accumulator with the source, and the accumulator with the pump may be of small diameters.

Further and more specific objects and advantages of the present invention will be apparent from the following description taken in connection with the accompanying drawings in which—

Figure 1 is a diagrammatic view illustrating an embodiment of the control system for the landing gear, Figure 2 is a partial view on an enlarged scale and partly in section of one-half of the system, Figure 3 is a diagrammatic illustration of the connection between the hydraulic relay and the mechanical locking means, and Figure 4 is a view similar to Figure 3 illustrating a modification.

In accordance with the invention the retractable landing gear may be of any conventional type providing the operation thereof is effected by hydraulic jacks.

In the drawings each half of the landing gear is movable through a double-acting hydraulic jack denoted respectively at 1 and 1a. Each of these jacks is fed by a hydro-pneumatic accumulator denoted respectively at 2, 2a. The components relating to the right half of the landing gear system being identical with and similarly disposed to those components relating to the left half of the system, they are, for the most part, indicated on the drawing by the same reference numerals followed by the index letter a.

The cylinder of the hydraulic jack 1 has a piston 3 therein which defines in the jack two chambers 4 and 5. The actuation of the half of the landing-gear, for retraction as well as for lowering, is effected by the piston rod 6.

The hydraulic jack 1 is fed by the hydropneumatic accumulator 2, through distributing relays 7 and 8. The distributing relay 7 is connected to the chamber 4 by a pipe 9, and the distributing relay 8 is connected to the chamber 5 by a pipe 10. The distributing relay 7 places the chamber 4 in communication either with the hydro-pneumatic accumulator 2, or with the tank 11, according to the position of a controlling device noted generally at 12 and disposed within reach of the pilot, and, simultaneously, the distributing relay 8 places the chamber 5 in communication either with the tank 11 or with the hydro-pneumatic accumulator 2.

From the hydro-pneumatic accumulator 2 extends a pipe 13 for feeding the distributing relay 8. From this pipe 12 extends a pipe 14 for feeding the distributing relay 7, and a branch pipe 15 for conveying fluid under pressure to the controlling device 12. In the system the accumulators 2 and 2a are maintained under pressure by a pump 16, sucking liquid from the tank 11 and discharging the liquid under pressure into a pipe 17; the connection between this latter and the accumulator 2 including a suitable one-way valve device 18. On pipe 17 is provided an automatic by-pass device 18', known per se and preventing the pressure of the accumulator 2 from exceeding a given value.

The accumulators 2 and 2a are of such capacity as to assure, without recharging, two successive operations of the gear, for example one retraction and one lowering. Pipes 15, 15a and 17 may therefore be of small diameter.

The controlling device 12 is fed from the pipe 15, from which extends a pipe 19 dividing into two branches 20 and 21 which respectively provide communication with the two distributors 22 and 23, of the controlling device 12.

The controlling device 12 includes a handle 24 having two arms 25 and 26 by which the distributors 22 and 23 may be selectively actuated. The distributor 22 is devoted to the retraction of the landing gear, and the distributor 23 to its lowering. A pipe 27 sub-divides into pipes 28 and 28a and constitutes the flow transmitter between the distributor 22 and the distributing relays 8 and 8a. A pipe 29 sub-divides into two pipes 30 and 30a, constituting the flow transmitter between the distributor 23 and the distributing relays 7 and 7a.

The emptying of, or return flow from, the various devices is effected through a pipe 31 of large section which is connected to the tank 11. To pipe 31 is connected a pipe 32 extending from the distributing relays 7 and 8, a pipe 33 extending from the controlling device 12 and a pipe 32a extending from the distributing relays 7a and 8a.

The construction of one of the distributing relays, for instance the relay 7, will now be described with particular reference to Fig. 2. The distributing relay 7 includes a cylindrical portion 34 in which a piston 35 is slidably mounted so as to define two variable volume compartments therein, denoted respectively at 36 and 37. A pipe 30 extends into and provides fluid flow into the compartment 37. This pipe preferably extends through a ring 38 limiting the movement of the piston 35. The rod 39 of the piston 35 passes through the bottom 40 of the cylindrical portion 34 through suitable packing 41. The piston 35 is also provided with suitable packing 42. A spring 43, abutting against the other end 44 of the portion 34 reacts against the face of piston 35 directed towards the compartment 36. The said face of the piston carries a buffer 45 cooperating with a rod 46 which, is movable through an opening 47, provided in the end 44 of the cylindrical body 34. This rod 46 is provided with a collar or flange 48 subjected to the action of a spring 49 controlling a hydraulic relay 50 of a type known per se.

This hydraulic relay 50 includes a valve 51 having a hollow body and a cap or head 52 cooperating with an apertured diaphragm 53 and controlling communication between a chamber 54 at one end of the relay 50 and into which chamber fluid flows from the pipe 14 and a compartment 55 provided between the face of the diaphragm 53 remote from chamber 54 and another apertured diaphragm member 58. This latter member 58 is hollow and includes opposite end walls through which the hollow body of the valve 51 is slidable. The hollow valve body is provided with lateral ports 56 and 57 which permit the fluid to flow from chamber 54 through the aperture in diaphragm 53 through port 56 through the hollow body out of port 57 through the hollow diaphragm member 58 into the conduit or pipe 9 providing communication with the chamber 4 of the jack 1. A further compartment 59 is provided in the valve 50 between one end face of the hollow member 58 and the end wall 44 of the cylindrical portion 34. The spring 49 is disposed within this compartment and bears against the flange or collar 48 and this compartment 59 is connected by means of a conduit or pipe 60 with the corresponding compartment 61 of the relay 8 and which compartment 61 is in communication through the pipe 32 with the return pipe 31 to the tank 11. A coil spring is provided in the chamber 54 which bears between the end of the relay into which the pipe 14 extends and the adjacent face of the head or cap 52 of the valve 51.

The distributing relay 8 is of similar construction to that of distributing relay 7. Within its cylindrical body 62 is a piston 63 having a rod 64 and a buffer 65 acting on a rod 66 cooperating with a valve 67 similar to the valve 51, a rod 66 cooperating with a valve 67 similar to the valve 51. The pipe 13 communicating with the compartment 68 of the hydraulic relay 69, and the pipe 10 extending from the space enclosed by the hollow diaphragm 70.

The distributors 22 and 23, constituting the control device 12, are also of the type which has just been described. The valve head or cap 71 of the distributor 22 controls communication between the pipe 20 and the pipe 27 and thereby fluid flow to the rear of the piston 63. The cooperation of rod 72 with the free end of the hollow body of the valve 73 controls the communication between the pipe 27 and the pipe 33 to the tank. A light spring 74 constantly urges the valve head or cap 71 against its seat and another spring 75 maintains constantly the contact between the projecting part 76 of the rod 72 and the arm 25 of the controlling handle 24. Compartments 77 and 78 in which moved the rods, 72 and 79, respectively, are connected by a pipe 80.

The distributing relays are such, that before operating the jacks 1, 1ª they cause the unlocking of the landing gear for allowing the movement of retraction or of protraction. This unlocking occurs during the phase in which the piston of a distributing relay, for example, the piston 35, approaches towards the rod 46. For this purpose, a substantial play or space is intentionally provided between the front face of the buffer 45 and the adjacent face of the rod 46. The buffer 45 and the rod 46 are shown in their extreme positions in Figure 2 in connection with the distributing relay 7.

The connection between the distributing relay and the corresponding unlocking device is further such, that when the unlocking is effected, during the approaching stroke of the piston 35 or 63, the unlocked condition remains during the subsequent movement of the piston which controls the operation of the hydraulic relay.

By way of example Fig. 3 shows a mechanical connection which can be used for the control of one of the locking devices of the landing gear, for instance of the device for the locking in the retracted position or up-lock. This connection is operative from a distributing relay, for example the distributing relay 7. The piston rod 39 of this distributing relay is connected, through an articulation 81, to an elongated rod 82 which is slidably mounted in fixed guides 83 and 84. This rod includes a projection 85, or cam, the shape of which is advantageously that shown on Fig. 3, that is to say, it includes a face 86 parallel to the axis of the rod 82 and an inclined face, as at 87, between faces 86 and the rod proper. With these faces 86 and 87 cooperates a roller or cam-follower 88 mounted on the upper end of a rod 89 which slides in a fixed guide 90. The other end of this rod is in permanent contact with an arm 91 of a double-armed lever 92 rotatably mounted on a pivot 93; the other arm 94 forms, with a pin 95 having a beveled top 96, the lock proper. The pin 95 is slidably mounted in a bore 97 provided in the landing gear and is urged upwards by a spring 98. A spring 99 acting against the arm 94 constantly urges the roller 88 toward the axis of rod 82.

In the position shown in Figs. 1 and 2, the landing gear is in its retracted position. The chamber 5 of the hydraulic jack is in permanent connection by pipe 10, the hydraulic relay 8, and the pipe 13, with the hydro-pneumatic accumulator 2, so that the eventual dilatations of the liquid take place freely. The piston 63 is maintained in its operative position, that is to say, in position for actuating the hydraulic relay 8, due to the pressure which exists constantly in the rear chamber of the cylindrical portion 62 in which pressure emanates from the flow of fluid through pipe 15, thence through at this time distributor 22, whose rod 72 is then depressed, thence through conduits 27, 28 into said rear chamber. On the contrary, the piston 35 of the distributing relay 7 is applied against the ring 38, the chamber 37 being then connected to the reservoir 11 through the pipes 30 and 29, the distributor 23, the pipe 80, the chamber 77 of the distributor 22, and pipes 33 and 31. In this position of piston 35, the gear is locked in its retracted position by cooperation of the double armed lever 92 and the pin 95. This locking remains even if damage occurs in the hydraulic circuit operating the gear, as the position of piston 35 which assures the locking is that which corresponds to the lack of pressure in the chamber 37.

For lowering the gear, it is only necessary to reverse the movement of handle 24 in order that the arm 25 leaves the rod 72 and the arm 26 engages and moves the rod 79. The closing of the valve 73 of the distributor 22, and the separation, urged by the spring 75, acting between the rod 72 and this valve, cuts off the connection between the pipe 27 and the pressure pipe 15, and connects this pipe 27 with the pipe 33 issuing through 31 to the tank 11. The pressure behind the piston 63 disappears and the piston takes up its inoperative position, thus putting into clutching condition the device for the locking of the gear in the lowered position. The valve 67 is applied on its seat, and the chamber 5, previously connected with the pressure pipe 13 through the distributing relay 8, is connected to the pipe 32 returning to the tank 11.

Simultaneously, the actuation of the rod 79 has connected the chamber 37 of the distributing relay 7 with the pressure pipe 15 through the pipes 30 and 29, the distributor 23, and the pipes 21 and 19. At the same time, the connection which was previously established between the chamber 37 and the tank—and which allowed the liquid contained in this chamber to dilate freely without the position of the piston 35 being changed thereby—is cut off by the application of the end of the rod 79 against the open end of the valve of the distributor 23.

When the chamber 37 is under pressure, piston 35 moves to the left against the action of spring 43. During the initial phase of this movement the buffer 45 approaches the rod 46 and simultaneously roller 88 rolls on the inclined face 87 of the cam 85 so that the double-arm locking lever is rotated by the action of spring 49 on arm 94, thus disengaging the locking pin 95, thereby unlocking the landing gear from its retracted position. Up to the moment that the gear is unlocked, there has been no hydraulic force acting thereon to urge the same to lowered or extended position so that the means for locking the gear in retracted position have not been subjected to any undue efforts.

When the buffer 45 comes into contact with the rod 46, the gear is unlocked, and the continuation of the movement of the piston 35 no longer influences the position of this locking device. Upon continued movement of rod 46, the hydraulic relay 50 is brought into operation, in the customary manner, that is, the pipe 9, formerly connected with the tank through the hydraulic relay 50, the pipe 60, the hydraulic relay 69 and the pipe 32, is isolated from the tank, and, on the contrary, is connected with the pressure pipe 14 through the said hydraulic relay 50. The pressure which thus arrives in the chamber 4 of the hydraulic jack 1 causes the lowering of the landing gear. When this latter reaches its lowered position, it locks itself automatically, because the device for the locking in lowered position or down-lock is then back in its active position.

The retraction of the gear is carried out by an operation inverse to the preceding one, and the inverse phases occur.

In Fig. 4 is shown a modification of the mechanical connection between the hydraulic relays 7 and 8 and respectively the up-lock and the down-lock of the gear. In this modification, the locking of the gear in its retracted position is assured by a hook 100 hinged at 101 and with which is engaged a pin 102 carried by a lug 103 on the body 104 of the shock-absorber. This latter is rotatably mounted about axis 105. The hook 100 is maintained in locked position by a spring 106. To the hook 100 is attached a pulling wire 107 connected at its other end to the rod 39 of the distributor relay 7. When this distributor relay is actuated to lower the gear, the hook 100 is first moved against the action of the spring 106 and the gear is unlocked. The release position of the hook 100 and the pulling wire 107 is shown in dotted lines. The releasing movement of the relay 7 in Fig. 4 is to the right and the continued movement of the piston rod 39 has no further effect on this up-lock device except that it pulls still more the spring 106. During the next retraction of the landing gear the hook 100 is returned to its active position by the action of this spring 106, so that when the gear reaches its retracted position it locks itself automatically by the snapping of the pin 102 behind the bevelled face 108 of the hook 100.

In this modification, the locking of the gear in the lowered position is assured by a hook 109, rotatably mounted around an axis 110 intermediate the ends of the hook, and which hook cooperates with a pin 111 carried by one of the elements 112 of a folding strut 113 interposed between the body 104 of the shock-absorber and a fixed part 117 of the fuselage. In order to control the locking and the unlocking of the gear, a pulling wire 114 attached at one end to the free end of a hook 109 and at its other end the wire is connected to the rod 64 of the distributor relay 8. A spring 115 constantly urges the hook 109 to locking position. During the operation of retracting the gear, the wire 114, during the approaching stroke, that is the initial phase of movement of piston 63, swings hook 109 to the released position and the gear is unlocked for movement from its lowered position. The release position of hook 109 and its pulling wire 114 is shown in dotted lines in the drawing. The continued movement of the rod 64 takes advantage of the resilience of the spring 115. When the gear is next being lowered the hook 109 is returned to its active or locking position by the spring 115 and when the gear has reached its lowermost position, the hook 109 automatically locks itself by a snapping engagement between the engagement of the bevelled face 116 of the hook 109 over the pin 111.

Having now described my invention, what I claim, and desire to secure by Letters Patent, is:

1. In a retractable landing gear for aircraft hydraulic jacks for raising and lowering the same, a fluid circuit for effecting the movement of said jacks including a source of fluid under pressure, operating valve means in said circuit between said source and said jacks and including separate valves controlling the admission of fluid to opposite ends of the jacks to respectively move the jacks in opposite directions upon alternate operation thereof, each of said operating valve means including a movable member controlling the movement of the valve, said circuit further including means coupling the operating valve means associated at the same end of different jacks for actuation in unison so that the operating valve means are operable in pairs responsive to the movement of pairs of said movable members, selective energizing means including an element movable between two extreme positions for selectively moving pairs of said members, said members having an initial phase of movement not affecting said valve means but operable upon continued movement to actuate said valves, separate latching means for respectively immobilizing the gear in its raised and lowered positions, movable mechanical connections extending between said members and said locking means and operable upon movement to unlock the same, the movement of said connections being responsive to the initial movement of said members whereby upon selective actuation of said energizing means pairs of said members move and during initial movement unlock the locking means associated therewith and upon continued movement actuate the associated operating valves to permit fluid flow to the end of the jacks associated therewith whereby the jacks raise or lower the gear depending upon the position to which said energizing means is moved.

2. In a retractable landing gear for aircraft as defined in and by claim 1 in which said mechanical connections include a rod coupled to said member for movement therewith, a cam carried by said rod and in which said locking means includes a cam follower and means responsive to the movement of the follower to permit unlocking of the locking means.

3. In a retractable landing gear for aircraft as defined in and by claim 1 in which said locking means includes a pivoted latch and in which said mechanical connections include cables respectively connected between said latches and said members and responsive for moving said latches to unlocked position upon initial movement of said members.

4. In a retractable landing gear, a hydraulic jack, an accumulator adjacent said jack, hydraulic connections between said jack and said accumulator, operating valve means in said connections to enable the accumulator when charged to operate the jack under control of the operating valve means, hydraulic actuating valve means and a source of pressure, piping independently connecting said accumulator and said actuating valve means with said pressure source and said actuating valve means with said operating valve means, locking means for retaining said gear in a fixed position, said operating valve means including a member movable responsive to fluid flow through said piping independently connecting said actuating valve means with said operating valve means, said member being capable of an initial movement during which it does not affect said valve means, and a subsequent movement during which it affects said valve means to permit fluid flow from said accumulator to said jack, a mechanical connection between said member and said locking means and movable in response to the initial movement of said member to unlock said locking means whereby upon operation of said actuating valve means said member moves to initially unlock said locking means and thereafter to control said operating valve to permit fluid flow from said accumulator to said jack to move said gear.

5. In a retractable landing gear for aircraft hydraulic jacks for raising and lowering the gear, mechanical means for locking the gear in its raised and lowered positions, a fluid circuit for effecting the movement of said jacks and including accumulator means, operating valve means between the accumulator means and the jacks, said operating valve means including separate valves controlling admission of fluid to opposite ends of the jacks, a fluid pressure responsive member associated with each valve and movable to operate the same, said member having an initial phase of movement not affecting the valve, conduits providing communication between said accumulator and said operating valve means and through which fluid under pressure flows to move said members, additional valve means interposed in said conduits controlling fluid flow therethrough, said valve means being alternately movable so as to alternately control flow of fluid to alternate members to effect movements thereof for alternately controlling the admission of fluid to opposite ends of said jacks, means for imparting alternate movement of said last-named valves selectively and mechanical connections extending between said members and said locking means, said connections being operable upon movement of said members to unlock said locking means during initial movement of said members and before said members actuate the valves associated therewith to permit fluid flow to the jacks.

6. In a retractable landing gear a pair of hydraulic jacks, a retractable landing gear member associated with each jack and raised and lowered thereby, pivoted self-locking latches automatically operable to lock said landing gear members in their respective raised and lowered positions, a control circuit for said jacks including a pair of accumulators, branch piping connecting the accumulators with the opposite ends of each jack, an operating valve means in each branch of said piping, said valves being normally closed and operable when opened to permit fluid flow from said accumulators to said jacks, piping connecting the accumulators, branched piping communicating with the piping connecting the accumulators intermediate the same, a control valve means in each branch thereof, said operating valve means each including a cylinder and a piston movable to open the valve, piping connecting said cylinders behind said pistons with the control valve means in said second-mentioned branched piping, additional piping connecting said control valve means in circuit with said accumulators, a reservoir and a pump communicating with said pipe to maintain pressure in said accumulators, said control valve means each including a normally closed valve preventing fluid flow therethrough, a reciprocable member to open said valve, and means normally holding the reciprocable member in inoperative position, a movable selector element cooperable with said reciprocable members and movable in selected positions to alternately and selectively move said members to control said valves and thereby fluid flow to said pistons to automatically open the valves in the operating valve means to permit fluid flow to said jacks and mechanical means directly connected to said pistons and operable upon said latches to unlock the same during initial movement of said pistons.

RENÉ LUCIEN LEVY.

REFERENCES CITED

The following references are of record in the file of this patent:

UNITED STATES PATENTS

| Number | Name | Date |
| --- | --- | --- |
| 1,847,688 | Couwenhoven | Mar. 1, 1932 |
| 2,130,618 | Gnavi | Sept. 20, 1938 |
| 2,249,850 | Palmer | July 22, 1941 |
| 2,253,112 | De Boysson | Aug. 19, 1941 |
| 2,278,910 | Bertrán | Apr. 7, 1942 |
| 2,290,479 | Mercier | July 21, 1942 |
| 2,294,467 | Lemonier | Sept. 1, 1942 |
| 2,343,495 | Campbell | Mar. 7, 1944 |
| 2,412,053 | Lucien | Dec. 3, 1946 |